Oct. 18, 1949.　　　　　　　L. VERMETTE　　　　　　　2,485,518
MACHINE FOR STRIPPING INSULATION FROM WIRE
Filed Feb. 16, 1945　　　　　　　　　　　　　　　3 Sheets-Sheet 2

INVENTOR.
LUCIEN VERMETTE

BY Victor J. Evans & Co.
ATTORNEYS

Oct. 18, 1949.                L. VERMETTE                    2,485,518
                    MACHINE FOR STRIPPING INSULATION FROM WIRE
Filed Feb. 16, 1945                                   3 Sheets-Sheet 3
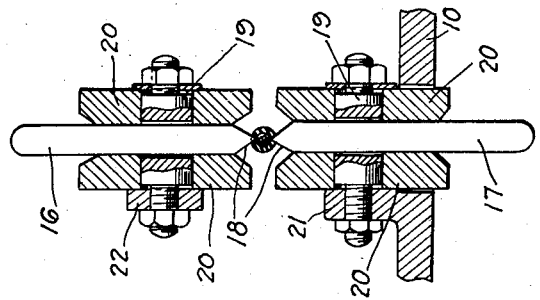
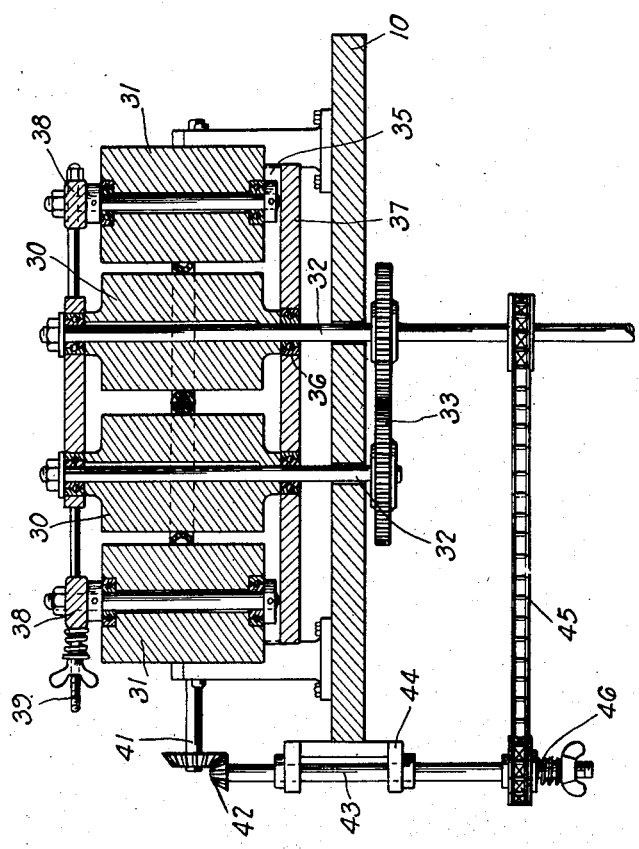
INVENTOR.
LUCIEN VERMETTE
BY *Victor J. Evans & Co.*
ATTORNEYS Patented Oct. 18, 1949

2,485,518

UNITED STATES PATENT OFFICE 2,485,518

MACHINE FOR STRIPPING INSULATION FROM WIRES

Lucien Vermette, Yonkers, N. Y.

Application February 16, 1945, Serial No. 578,341

2 Claims. (Cl. 81—9.51)

The invention relates to a stripping machine, and more especially to insulated wire stripping machines.

The primary object of the invention is the provision of a machine of this character, wherein the insulation covering of wire can be automatically stripped from the wire during delivery thereof from a roll of the same, and the stripped wire rerolled during the operation of such machine, the stripping being effected with dispatch and clearing the wire thereof, while the stripped material will be deposited in containers therefor remote from the machine.

Another object of the invention is the provision of a machine of this character, wherein the construction thereof is novel and the working unique, there being no irregularities in the stripping operation, which is accomplished automatically, thus relieving manual labor for this purpose, and requiring but a single attendant for the handling of such machine.

A further object of the invention is the provision of a machine of this character, wherein the length of wire will be straightened and fed in a linear course for the stripping of insulation therefrom, without the passage of such wire through a tubular guide, thus exposing the wire during the stripping operation to full view for detection of any irregularities in the stripping action thereon.

A still further object of the invention is the provision of a machine of this character, which is simple in construction, thoroughly reliable and efficient in operation, strong, durable, automatic in the working thereof, eliminates kinking of the wire acted upon, assures close rolling of the wire stripped, the machine being continuous in the working of the same, inexpensive to manufacture and install.

With these and other objects in view the invention consists in the features of construction, combination and arrangement of parts as will be hereinafter set forth in detail, illustrated in the accompanying drawings, which show the preferred embodiment of the invention, and pointed out in the claims hereunto appended.

In the accompanying drawings:

Figure 4 is a sectional view taken on the line 4—4 of Figure 2 looking in the direction of the arrows.

Figure 5 is a detail sectional view taken approximately on the line 5—5 of Figure 2 looking in the direction of the arrows.

Similar reference characters indicate corresponding parts throughout the several views in the drawings:

Figure 1:
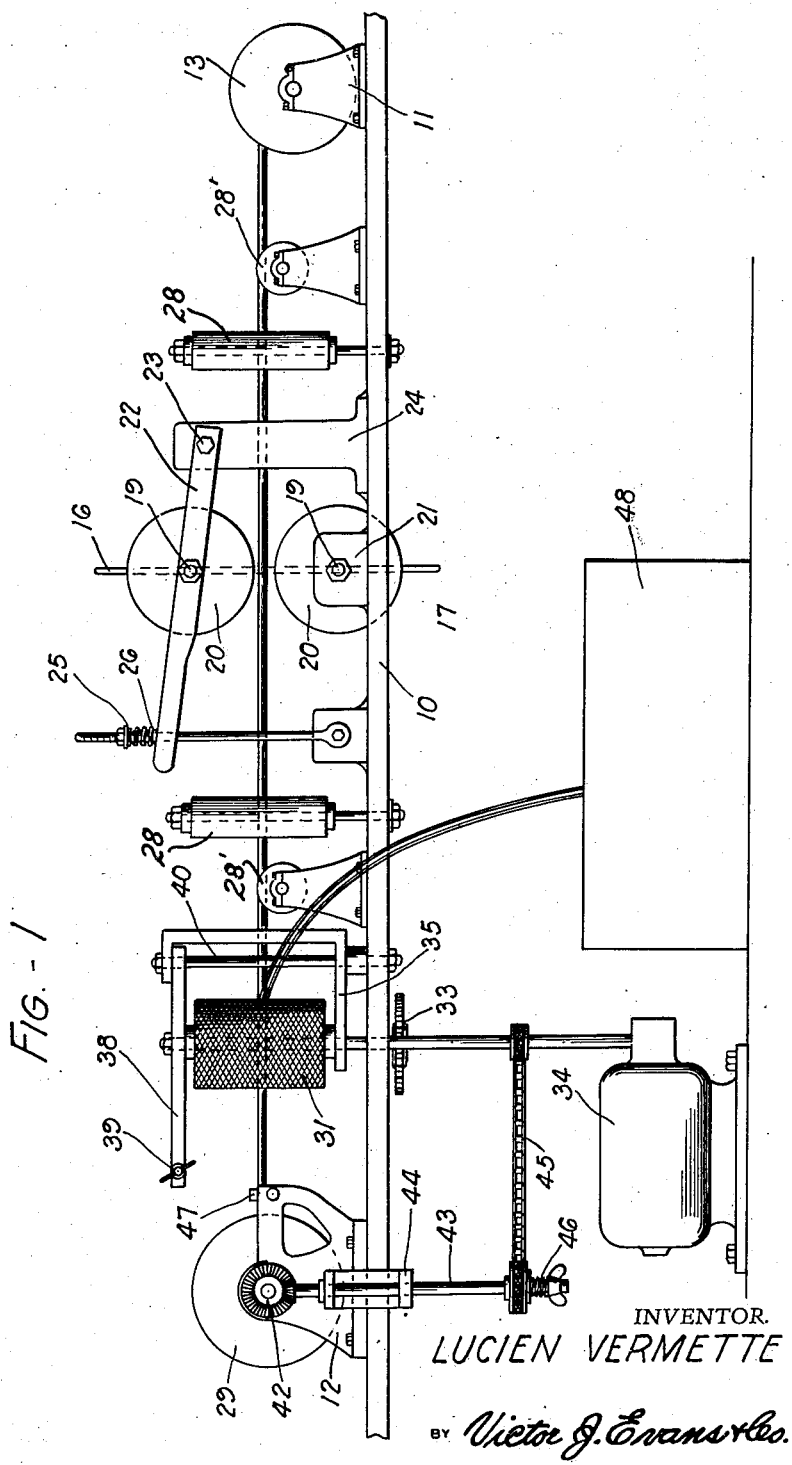
Figure 1 is a side view of the machine constructed in accordance with the invention.

Referring to the drawings in detail, the machine constructed in accordance with the invention, comprises a horizontally supported table, a portion thereof identified at 10, which may be of the required length and width for working purposes. Rising vertically from the top of this table are fore and aft spaced pairs of spaced bearings 11 and 12, respectively, while removably fitted in the fore bearings is a supply reel 13, which is horizontally disposed and carries a roll 14 of insulated wire, and the aft bearings removably carry a recoverable reel 29, which is also horizontally disposed, for receiving a roll 15 of stripped wire after its length has been operated upon by the machine as will be hereinafter described.

Located intermediately of the reels 13 and 29 is a cutter device, which comprises the upper and lower cutters 16 and 17, respectively, each having a knife edge cutting tip 18, both being in confronting relation to insulation on the wiring, and such cutters are adjustably held in guide studs 19 for chuck cheeks 20 of disk form opposite each other in pairs. The stud 19 for the lower cutter 17 is carried in a hanger 21 on the table, while the stud 19 for the upper cutter 16 is carried on a vertically swinging arm 22 pivoted at 23 on a stand 24 at one end, while the other end has connection with a tensioning device 25, which functions for holding this upper cutter under pressure by a spring 26 which is adjustable, urging such cutter in close cutting relation to the cutter 16 during the working of the machine.

Arranged at opposite sides of the cutter device are vertically and horizontally rotatable guide rollers 27 and 28, respectively, which straighten the wire in its travel during the stripping operation in a lineal direction of the machine while a grooved guide roller 28' mounted on the cable between the spool 13 and the first set of guide rollers and after the second set of guide rollers maintained the cable in a straight line horizontally of the table.

Next to the spool 29 is a stripping mechanism, comprising intermediate stripping rollers 30, and outer stripping rollers 31, these being vertically disposed, above the table, and the arbors 32 for the intermediate rollers 30 are intergeared at 33, and one of these arbors is continued to have driving connection with a power unit 34, which in this instance is an electric motor located beneath the table at the delivery end thereof.

Figure 2:
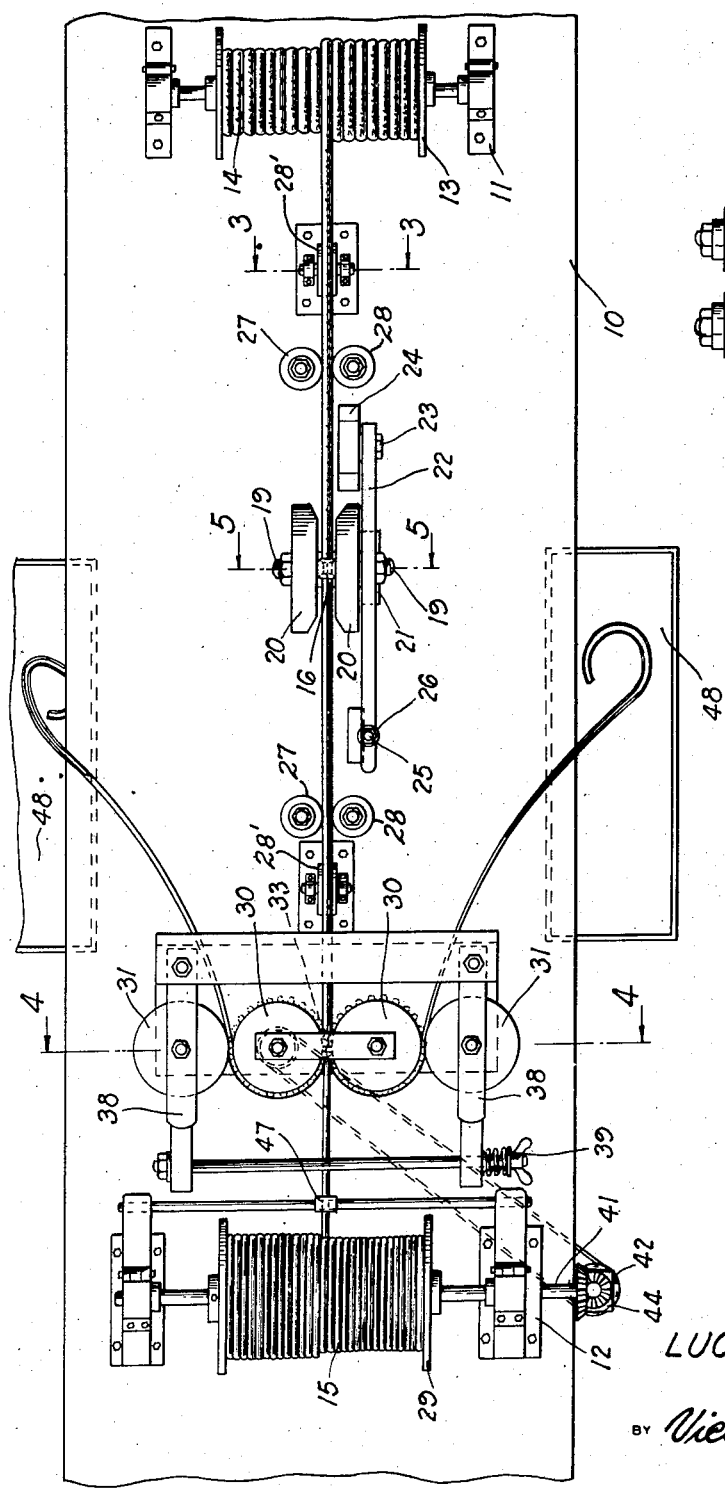
Figure 2 is a top plan view thereof.
Figure 3:
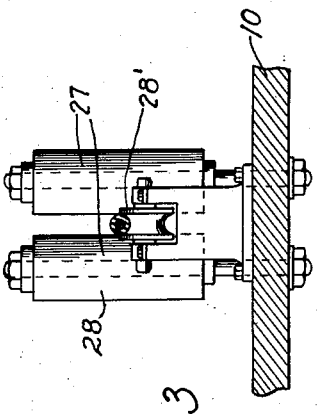
Figure 3 is a sectional view taken on the line 3—3 of Figure 2 looking in the direction of the arrows.

The rollers 30 and 31 are grouped in a racking bracket 35, the intermediate rollers 30 being journalled at 36 in the horizontal base 37 of such bracket, while the rollers 31 are supported in spreading hangers 38 of the bracket, so that such rollers can be moved laterally toward and away from the rollers 30, as best seen in Figures 2 and 4 of the drawings. The rollers 30 and 31 have knurled working surfaces thereto.

The hangers 38 are provided with an adjustable tensioning device 39 for the stripping action of the rollers 31 in cooperation with the rollers 31.

The bracket 35 is fixedly held on vertical standards 40, fitting the table, and these standards afford pivots for the hangers 38, as best seen in Figure 1 of the drawings.

The turning shaft 41 for the reel 29 through meshing gearing 42 has connection with a driven shaft 43 journalled in a bearing 44, which through chain and sprocket connections 45 is driven from the arbor 32 operated from the power unit 34, there being a braking medium 46 included with such connections 34 so as to assure close winding of the wire on the reel 29 during the working of the machine.

Vertically swingable on the bearings 12 and bridging the wire to the reel 29 is a follower 47 for the wire for the close coiling of the wire on the said reel after the stripping operation of the machine.

In the operation of the machine the wire covered with insulation is introduced between the tips 18 of the cutters 16 and 17, which severs the covering at diametrically opposite points on the said wire, then this wire in that condition is delivered to the stripping mechanism, the split covering to the wire is trained between the intermediate rollers 30 and the outer rollers 31, these being adjacent to each other to strip the severed covering from the wire, which in the stripped condition is coiled onto the reel 29, and is closely and tightly wound thereon. The stripped insulation is deposited in containers 48 located beneath and at opposite sides of the table of the machine, as best seen in Figure 2 of the drawings.

The adjustment of the working parts of the machine should be clearly obvious, so a detailed explanation thereof has been omitted for the sake of brevity from the foregoing description of the invention.

What is claimed is:

1. In a machine for stripping insulation from wires, having a supporting table provided with a supply reel for insulated wire at one end thereof and a recovery reel for the wire at the other end thereof, horizontally and vertically disposed guide rollers mounted on the table for guiding the wire from the supply reel to the recovery reel, and power means for said recovery reel to draw the wire from said supply reel, the improvement comprising a support mounted on the table intermediate of the guide roller, a cutter disc rotatably mounted in said support for engaging the lower surface of the insulated wire, a second support mounted on the table to one side of and adjacent to the first support, an arm pivotally mounted on said second support, a second cutter disc on said arm above and in alinement with said first cutter disc for engaging the upper surface of the insulated wire, a third support on said table on the opposite side of and adjacent to said first support, tension means carried by said third support and connected to said arm to tension said second cutter disc downwardly toward said first cutter disc and means mounted on said table before said recovery reel for stripping the insulated wire after it has passed through said cutter discs.

2. In a machine for stripping insulation from wires having a supporting table provided with a supply reel for insulated wire at one end thereof and a recovery reel for the wire at the opposite end thereof, horizontally and vertically disposed guide rollers mounted on the table for guiding the wire from the supply reel to the recovery reel, power means for driving said recovery reel to draw the wire from said supply reel and cutting means for the wire mounted on the table intermediate of said guide rollers, the improvement comprising a supporting frame mounted on the table forwardly of the recovery reel, hangers pivoted to the frame at each end thereof, a pair of intermediate rollers journalled in said frame, power means for said rollers, a pair of outer rollers journalled in said frame at their lower ends and in the hangers at their upper ends, means carried by the hangers for tensioning the outer rollers toward the intermediate rollers so that when the wire is passed through said intermediate rollers said outer rollers will engage the insulation on the wire previously cut by said cutting means and strip the insulation from the wire.

LUCIEN VERMETTE.

REFERENCES CITED

The following references are of record in the file of this patent:

UNITED STATES PATENTS

| Number | Name | Date |
|---|---|---|
| 1,052,271 | Pessin | Feb. 4, 1913 |
| 1,626,119 | Olin | Apr. 26, 1927 |
| 1,929,915 | Deitz, Jr., et al. | Oct. 10, 1933 |
| 1,929,916 | Deitz, Jr. | Oct. 10, 1933 |
| 2,429,611 | Churnell | Oct. 28, 1947 |
| 2,435,660 | Tileston | Feb. 10, 1948 |

FOREIGN PATENTS

| Number | Country | Date |
|---|---|---|
| 523,043 | Germany | Apr. 18, 1931 |